Feb. 20, 1951 J. H. BANNON 2,542,459
POLYMERIZATION PROCESS
Original Filed Feb. 2, 1946
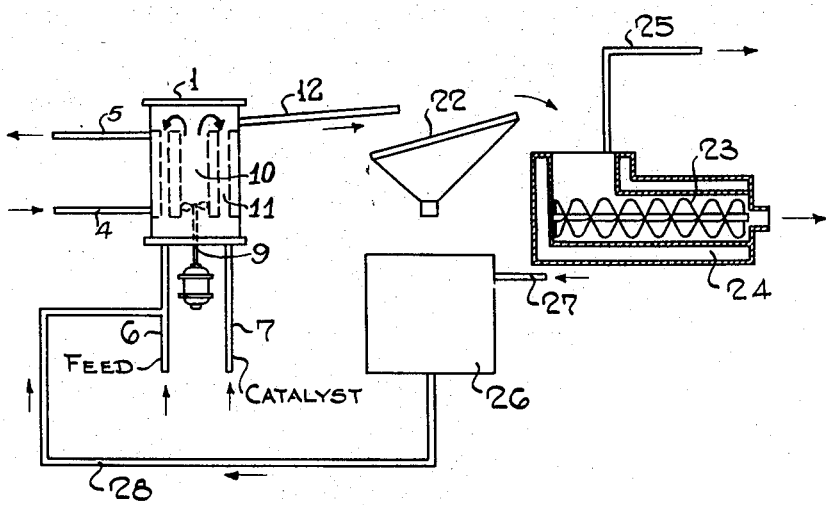
John H. Bannon Inventor
By C. L. Stokes Attorney Patented Feb. 20, 1951

2,542,459

UNITED STATES PATENT OFFICE 2,542,459

POLYMERIZATION PROCESS

John H. Bannon, Cranford, N. J., assignor to Standard Oil Development Company, a corporation of Delaware Original application February 2, 1946, Serial No. 645,140. Divided and this application April 3, 1947, Serial No. 739,174

8 Claims. (Cl. 18—47.5)

This invention relates to the low temperature polymerization of olefinic material and relates more particularly to a method for effecting dry recovery of the polymerized material and is a division of Ser. No. 645,140, filed February 2, 1946, now abandoned.

It has been found possible to polymerize olefinic material such as the iso-olefins, especially isobutylene, either alone or in admixture with a polyolefin such as butadiene, isoprene, piperylene and the like, at temperatures ranging from about 0° C. to −40° C. down to −127° C. or lower to −164° C.; to yield a high molecular weight rubbery polymer which when prepared from a mixture of an iso-olefin and a diolefin is reactive with sulfur and other curing agents in a curing reaction to yield a material having a good tensile strength ranging from 1000 to 4600 pounds per square inch and an elongation at break ranging from 300% or 400% to 1200%. This reaction uses a Friedel-Crafts type catalyst, preferably in solution in a low-freezing, non-complex forming solvent; aluminum chloride dissolved in ethyl or methyl chloride or methylene chloride being particularly useful. The reaction which has previously been conducted by batch methods, is difficult to work, because of the fact that the polymer is obtained as particles which at higher temperatures tend to coagulate into a solid mass which is difficult to remove from a reactor, and difficult to handle.

If low temperatures are maintained, the polymer is obtained as a slurry of dispersed particles which show little or no tendency to coalesce.

In the past this polymer has been recovered from the reaction slurry by contacting the slurry with agitated hot water. This wet process involves several problems. The polymer must be slurried in the water, separated from the water later and then dried before final milling and finishing. Furthermore, when the polymer is agitated with the hot water, adhering solvent and unreacted monomers are released as gases which must be dried and liquified before being recycled to the reaction zone. This drying step for the recycle gases presents difficult problems since the gases must be contacted with a solid adsorbent which must be regenerated from time to time. The solid adsorbent also introduces chemical problems. Activated alumina is frequently used to dry the recycle gas. It converts in the presence of water small amounts of methyl chloride to methyl ether which stays in the recycle gases and eventually gets back into the polymerization reactor and thereby severely poisons the polymerization.

It is, therefore, the main object of this invention to provide a process for the preparation of isobutylene copolymers which overcomes the above disadvantages.

It is a further object of this invention to provide a process for the recovery of isobutylene copolymers, without the use of water and its attendant disadvantages.

It is a still further object of this invention to provide a method of recovering isobutylene copolymers in a dry state ready for finishing.

These and other objects of this invention are accomplished by contacting the polymer slurry with a hot metal surface whereby the solvent and unreacted monomers are released leaving the dry polymer on the metal surface. The polymer can then be scraped off and subsequently milled and otherwise finished without intermediate manipulative steps.

For a further understanding of the invention, reference may be had to the accompanying drawing in which the single figure is an elevational view, generally diagrammatic, showing an apparatus suitable for carrying out the present invention.

Referring to the figure, there is shown a reactor 1 such as described in the patent application of Bannon (U. S. Serial No. 448,575, filed June 26, 1942, now abandoned). No internal refrigerant is used, all the heat of reaction being transferred through the reactor walls to an external refrigerant. The liquid refrigerant, suitably ethylene, is introduced into the space between tube sheets through line 4, while vaporized refrigerant leaves the said space through line 5. Precooled reactant mixture of iso-olefin and di-olefin enters the reactor through line 6. The polymerization mixture desirably consists of from about 60 to 99.5 wt. per cent of an iso-olefin having from 4 to 8 carbon atoms per molecule, isobutylene being the preferred material; and from 40 to 0.5 wt. per cent of a diolefin. The diolefin may be butadiene or may be substantially any of the substituted butadienes up to those having from 10 to 12 carbon atoms per molecule. Preferred diolefins are isoprene, piperylene and dimethyl butadiene. Alternatively, the non-conjugated diolefins, such as dimethylallene, or the triolefins, such as myrcene, having up to 10 or 12 carbon atoms per molecule, may also be used. The polymerization mixture contains in addition from 100 parts to 700 or more parts of a diluent such as methyl chloride, ethyl chloride, methylene chloride, n-butane, isobutane, carbon disulfide, ethylidene difluoride, etc. However, it is possible to operate without the use of a diluent. The liquid ethylene as external refrigerant cools the mixture to a temperature between −90° C. and −103° C. Catalyst solution is added through line 7 provided with a suitable dispersing nozzle.

The catalyst conveniently consists of a solution of a Friedel-Crafts type catalyst such as boron trifluoride, aluminumbromide, or aluminum chloride in solution in a non-complex-forming, low freezing solvent such as ethyl or methyl chloride or carbon disulfide or other mono- or poly-halide containing up to 3 or 4 carbon atoms per molecule or other non-complex-forming solvent which is liquid at temperatures below about −30° C. The list of useable Friedel-Crafts catalyst is well shown by N. O. Calloway in his article on "The Friedel-Crafts Synthesis" in the issue of "Chemical Reviews" published for the American Chemical Society at Baltimore in 1935, being volume XVII, Number 3, the article beginning on page 327, the list being particularly well shown on page 375.

The reactant mixture is thoroughly agitated by impeller type agitator 9, so that a circulation of the reacting mixture is produced up through central tube 10 and down through a plurality of peripheral smaller tubes 11, set between tube sheets. The reaction if carried out in a halogenated diluent proceeds promptly to form a slurry of solid polymer particles in the diluent and unreacted olefinic components. In those cases in which no diluent is used the polymer forms as a highly dispersed gel in the cold reactant liquid. When a hydrocarbon, such as n-butane, is used as a diluent, the polymer forms a solution in the hydrocarbon. The rate of catalyst delivery with respect to the rate of delivery of fresh reactants is preferably adjusted to such a relationship that the proportion of solid polymer in the reacted mixture is less than about 30%. The polymerization reaction being exothermic, heat is liberated as the polymer forms, which is removed by the liquid ethylene in the space between the tubes. The reactor is maintained essentially full of liquid, a mixture of relatively finely divided polymer and excess unreacted hydrocarbons plus diluent overflowing from the reactor through line 12 in amount corresponding to the material fed to the reactor through lines 6 and 7 at a velocity of between 1 and 3 ft. per second, discharging onto a vibrating screen 22 which removes the bulk of the liquid from the polymer which is then removed from screen 22 directly into an extruder 23, heated to about 100°–200° C. For the purpose of securing this temperature, the extruder is provided with a steam jacket 24 into which superheated steam may be introduced. Upon contacting the heated screws the liquid in the polymer is immediately vaporized and flashed off through line 25. Thus the extruder screws perform the dual function of vaporizing the volatile material and working the polymer. Excess liquid removed from vibrating screen 22 is received in tank 26 provided with inlet 27 for the addition of make up solvent, if desired. The liquid thus recovered in tank 26 may be recycled to reactor 1 through line 28.

The invention is not to be construed as being limited to this embodiment, however, as the heating surface onto which the polymer slurry is discharged may be constructed in many different ways. Under some circumstances it may be found desirable to discharge the slurry onto a plane surface maintained in a suitable heated condition and to remove the polymer from the plane surface to an extruder, kneader, mill or other finishing means. Accordingly this invention may be described broadly as involving the formation of an olefinic polymer in the cold reaction medium, the discharge of the polymer and associated liquids onto a heated surface in such a manner as to form a sheet or a mass of dry polymer on the surface and the removal of the polymer from the heated surface and the finishing thereof.

The following examples are presented to show that the polymer can be recovered without recourse to a quenching liquid and without deleterious effect on the polymer.

*Example I*

A feed consisting of methyl chloride and isobutylene containing 2.5 per cent of isoprene and a catalyst consisting of a solution of AlCl₃ in methyl chloride were continuously fed to a liquid ethylene externally cooled continuous type of reactor equipped with an agitator. A slurry of polymer was formed in the reactor and continuously removed from the reactor by an overflow at the top. This slurry was cooled and a small amount of isopropyl alcohol was added at the same time. The cold slurry thus obtained was flashed in water and the polymer recovered. The recovered polymer was kneaded in water hot milled for fifteen minutes until dry and compounded.

*Example II*

A portion of the cold slurry obtained in Example VIII was screened to obtain a product containing about 30% polymer. This screened polymer was passed through an extruder which had been prechilled with methyl chloride. The effluent rubber from the extruder containing about 60% solids was weathered, hot milled to dryness and compounded.

*Example III*

A portion of the screened polymer obtained in Example IX was passed through an extruder heated by a steam jacket and removed from the extruder at 180–200° F. This effluent was hot milled and compounded.

*Example IV*

The process of Example X was repeated except that the polymer was passed through the extruder twice and the temperature of the final effluent was 230–240° F.

*Example V*

The process of Example X was again repeated except that the polymer was passed through the extruder three times and the temperature of the final effluent was 250–280° F. The product obtained in this example was completely degassed and no hot milling was necessary.

*Example VI*

Example XII was repeated except that 0.5% phenyl-beta-naphthylamine and 1% zinc stearate based on the polymer, were added to the polymer before passing the polymer through the extruder.

*Example VII*

A cold slurry from a different polymerization prepared as in Example VIII except that no alcohol was added to the slurry, was flashed in water, the polymer recovered, kneaded in water and hot milled for fifteen minutes until dry and then compounded. The crude polymer obtained in this example had a higher Mooney viscosity than that obtained in Example VIII.

*Example VIII*

A portion of the cold slurry obtained in Example XIV was screened, passed through a chilled extruder, weathered, hot milled and compounded as in Example IX.

*Example IX*

A portion of the screened polymer obtained in Example XV was completely degassed by passing it three times through a steam heated extruder as in Example XII.

Example X

Example XVI was repeated except that about 0.23%, based on the polymer, of 2,6-di-tertiary-butyl-4-methyl phenol was added to the polymer before passing the polymer through the extruder.

The above examples clearly indicate that the dry recovery of polymer from the slurry is feasible while the following inspection data obtained in cured samples of the product obtained in Examples I through X indicate that the quality of the product obtained by dry recovery is equal to that obtained by the usual wet recovery method.

*Evaluation of the rubber recovered by extrusion*

| Polymer from Examples | Mol. Wt. (Staud.) | Mole Per Cent Unsat. | Mooney Viscosity | Time of Cure | 10 Part Channel Black Cures | | 50 Part Channel Black Cures | | | Per Cent Rebound | | | |
|---|---|---|---|---|---|---|---|---|---|---|---|---|---|
| | | | | | | | | | | 40° C. | | 100° C. | |
| | | | | | T. S. | Elong. | T. S. | Elong. | Mod. 300% | 10 Pt. | 50 Pt. | 10 Pt. | 50 Pt. |
| | | | | Minutes | | | | | | | | | |
| I | 33,000 | 1.84 | 37 | 20 | 2,700 | 820 | 2,850 | 790 | 570 | 55 | 39 | 75 | 59 |
| | | | | 40 | 2,200 | 670 | 2,800 | 650 | 820 | | | | |
| | | | | 60 | 2,050 | 650 | 2,850 | 610 | 990 | | | | |
| II | 33,000 | 1.72 | 33 | 20 | 2,650 | 820 | 2,700 | 810 | 540 | 56 | 39 | 72 | 59 |
| | | | | 40 | 2,200 | 6°0 | 2,800 | 700 | 780 | | | | |
| | | | | 60 | 1,550 | 620 | 2,600 | 640 | 880 | | | | |
| III | 32,000 | 1.75 | 30 | 20 | 2,650 | 640 | 2,750 | 800 | 560 | 55 | 40 | 73 | 58 |
| | | | | 40 | 2,600 | 720 | 2,800 | 690 | 800 | | | | |
| | | | | 60 | 3,300 | 6°0 | 2,700 | 600 | 1,060 | | | | |
| IV | 35,000 | 1.72 | 36 | 20 | 2,500 | 800 | 2,700 | 810 | 510 | 55 | 37 | 75 | 57 |
| | | | | 40 | 2,100 | 670 | 2,650 | 660 | 870 | | | | |
| | | | | 60 | 2,000 | 600 | 2,800 | 600 | 990 | | | | |
| V | 32,000 | 1.76 | 29 | 20 | 2,750 | 840 | 2,800 | 800 | 510 | 56 | 37 | 77 | 57 |
| | | | | 40 | 2,250 | 650 | 2,750 | 630 | 900 | | | | |
| | | | | 60 | 2,100 | 620 | 2,750 | 610 | 1,010 | | | | |
| VI | 32,000 | 1.80 | 34 | 20 | 2,750 | 840 | 2,750 | 810 | 550 | 55 | 40 | 76 | 56 |
| | | | | 40 | 2,450 | 690 | 2,650 | 640 | 830 | | | | |
| | | | | 60 | 2,000 | 630 | 2,750 | 640 | 980 | | | | |
| VII | 36,000 | 1.53 | 52 | 20 | 3,150 | 890 | 2,900 | 790 | 530 | 59 | 40 | 77 | 59 |
| | | | | 40 | 2,850 | 730 | 3,000 | 670 | 740 | | | | |
| | | | | 60 | 2,200 | 670 | 2,900 | 650 | 810 | | | | |
| VIII | 37,000 | 1.92 | 52 | 20 | 3,000 | 790 | 2,900 | 820 | 390 | 57 | 44 | 78 | 63 |
| | | | | 40 | 2,750 | 730 | 2,950 | 740 | 600 | | | | |
| | | | | 60 | 2,400 | 670 | 3,000 | 680 | 770 | | | | |
| IX | 39,000 | 1.64 | 53 | 20 | 3,050 | 870 | 3,000 | 870 | 300 | 57 | 41 | 77 | 62 |
| | | | | 40 | 2,850 | 730 | 3,100 | 750 | 620 | | | | |
| | | | | 60 | 2,250 | 680 | 3,100 | 690 | 790 | | | | |
| X | 36,000 | 1.80 | 56 | 20 | 2,850 | 880 | 2,950 | 840 | 430 | 55 | 40 | 76 | 61 |
| | | | | 40 | 2,800 | 760 | 3,050 | 740 | 6°0 | | | | |
| | | | | 60 | 2,700 | 700 | 3,050 | 700 | 790 | | | | |

The nature and objects of the present invention having been thus described and illustrated, what is claimed as new and useful and desired to be secured by Letters Patent is:

1. In a process for copolymerizing an isoolefin and a multiolefin, the steps in combination of mixing together a major proportion of the isoolefin and a minor proportion of a multiolefin having from 4 to 12, inclusive carbon atoms per molecule, together with a halo-substituted alkane diluent, copolymerizing the mixed olefins in the presence of the diluent at a temperature within the range between −40° C. and −127° C., by the application to the cold mixture of olefins and diluent of a solution of a Friedel-Crafts type catalyst in a halo-substituted alkane compound to yield a slurry of solid copolymer in the diluent, catalyst solvent and residual portions of the mixed olefins, filtering the slurry to remove excess reaction liquid and discharging the resulting wetted solid particles directly without any intervening step into a heated screw extruder to effect volatilization of said diluent, catalyst solvent and residual olefins, and extruding a stream of solid, gas-free polymer through an orifice.

2. Process according to claim 1 in which the multiolefin is isoprene and the olefin is isobutylene.

3. Process according to claim 2 in which the catalyst is aluminum chloride.

4. Process according to claim 3 in which the solvent is methyl chloride.

5. Process according to claim 1 in which the multiolefin is butadiene.

6. Process according to claim 5 in which the catalyst is aluminum chloride.

7. Process according to claim 6 in which the solvent is methyl chloride.

8. In a process for copolymerizing isobutylene and isoprene, the steps in combination of mixing together 470 parts by volume of isobutylene with 7 parts by volume of isoprene together with 900 parts by volume of methyl chloride, cooling the mixture to approximately the temperature of liquid ethylene, adding to the cold mixture significant portions of a solution of aluminum chloride in methyl chloride in the proportion of approximately 2/10 grams of aluminum chloride per hundred c. of methyl chloride to yield a stable slurry of solid copolymer in the methyl chloride diluent, filtering the slurry to remove excess reaction liquid, discharging the resulting wetted solid particles directly without any intervening step into a heated screw extruder to effect volatilization of said diluent, catalyst solvent and residual olefins, and extruding a stream of solid gas-free polymer from said enclosure through an orifice.

JOHN H. BANNON.

REFERENCES CITED

The following references are of record in the file of this patent:

UNITED STATES PATENTS

| Number | Name | Date |
|---|---|---|
| 2,265,803 | Moss | Dec. 9, 1941 |
| 2,356,128 | Thomas et al. | Aug. 22, 1944 |
| 2,395,901 | Murphree | Mar. 5, 1946 |
| 2,405,480 | Wilde | Aug. 6, 194f |